United States Patent [19]

Hashimoto

[11] 4,246,442

[45] Jan. 20, 1981

[54] METHOD AND DEVICE FOR CONFIRMING CORRECT CONNECTION BETWEEN DATA TERMINALS IN DATA COMMUNICATION SYSTEM USING TELEPHONE NETWORK

[75] Inventor: Takemi Hashimoto, Kawasaki, Japan

[73] Assignee: Ricoh Company, Ltd., Tokyo, Japan

[21] Appl. No.: 790,550

[22] Filed: Apr. 25, 1977

Related U.S. Application Data

[63] Continuation-in-part of Ser. No. 521,135, Nov. 5, 1974, abandoned.

[30] Foreign Application Priority Data

Nov. 7, 1973 [JP] Japan ............................... 48-125114

[51] Int. Cl.² .......................... H04M 1/56; H04B 3/50
[52] U.S. Cl. ............................... 179/2 DP; 364/200;
371/24; 371/30; 371/67
[58] Field of Search ............... 179/2 DP, 1.5 A, 2 A,
179/2 CA, 15 AL, 1.5 R; 178/22; 340/146.1 C,
146.1 BA, 152 T, 153, 149 R; 364/200 MS File,
900, 200

[56] References Cited

U.S. PATENT DOCUMENTS

| | | | |
|---|---|---|---|
| 2,640,872 | 6/1953 | Hartley et al. | 340/146.1 C |
| 3,314,051 | 4/1967 | Willcox et al. | 179/2 DP |
| 3,327,288 | 6/1967 | Webber | 179/2 DP |
| 3,384,873 | 5/1968 | Sharma | 340/146.1 C |
| 3,397,287 | 8/1968 | Ishii et al. | 179/2 R |
| 3,484,694 | 12/1969 | Brothman et al. | 179/2 DP |
| 3,508,205 | 4/1970 | Kubie | 364/200 |
| 3,566,365 | 2/1971 | Rawson et al. | 364/200 |
| 3,654,604 | 4/1972 | Crafton | 340/149 R |
| 3,680,045 | 7/1972 | Meidan | 340/146.1 BA |
| 3,780,907 | 12/1973 | Colburn et al. | 179/2 A |
| 3,805,234 | 4/1974 | Masters | 340/146.1 C |
| 3,806,631 | 4/1974 | Patience et al. | 178/4.1 B |
| 3,892,948 | 7/1975 | Constable | 340/149 R |
| 3,984,637 | 10/1976 | Caudill | 179/2 DP |
| 3,986,169 | 10/1976 | Kobayashi et al. | 340/146.1 C |
| 4,017,829 | 4/1977 | Sternat | 340/146.1 C |
| 4,114,139 | 9/1978 | Boyd et al. | 179/2 DP |

OTHER PUBLICATIONS

E. W. Anderson, "Data Transmission Facilities for Industrial Customers", Reprinted from Telephony, Data Communications, 9/21/67, p. 4.

*Primary Examiner*—Bernard Konick
*Assistant Examiner*—Randall P. Myers
*Attorney, Agent, or Firm*—Cooper, Dunham, Clark, Griffin & Moran

[57] ABSTRACT

In a system of transceivers which can automatically operate either in calling or called modes, the identification codes of the calling and called transceivers are transmitted back and forth between them and compared in a manner which tends to minimize erroneous connections and to confirm only correct connections prior to starting the actual transmission of data between the transceivers.

4 Claims, 18 Drawing Figures

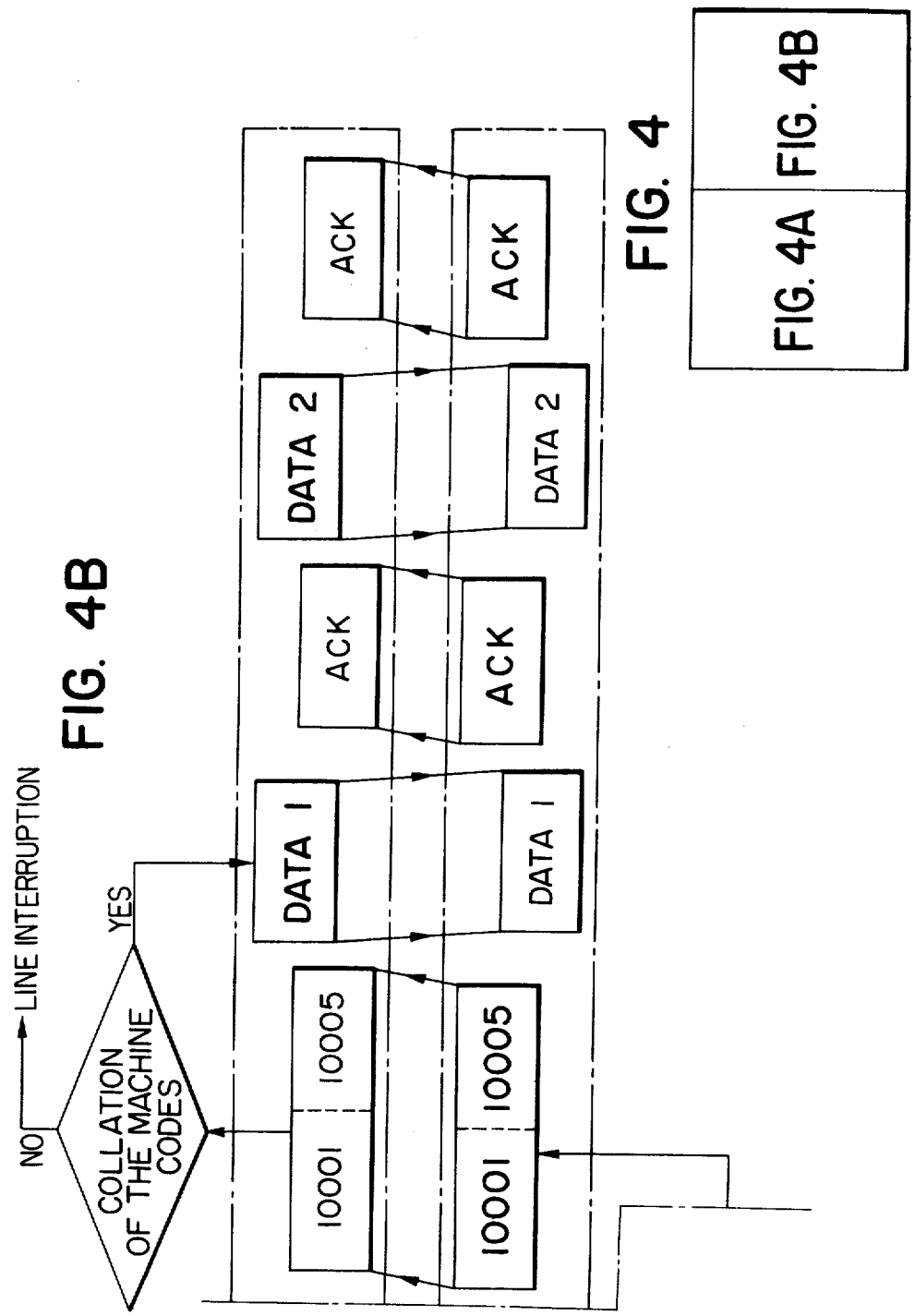

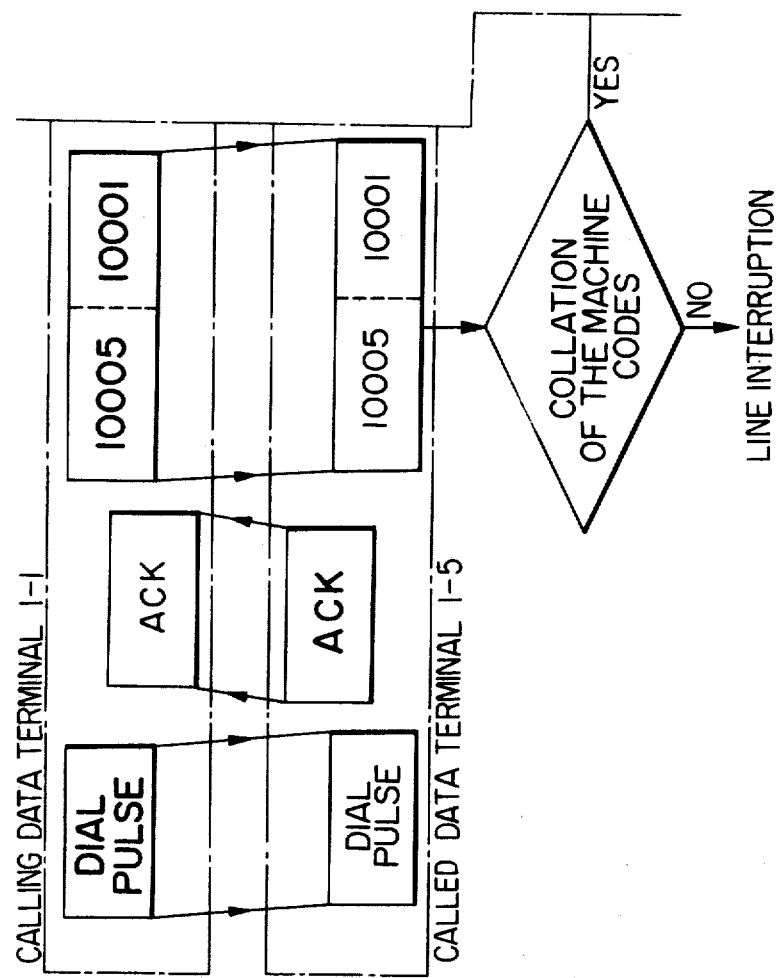

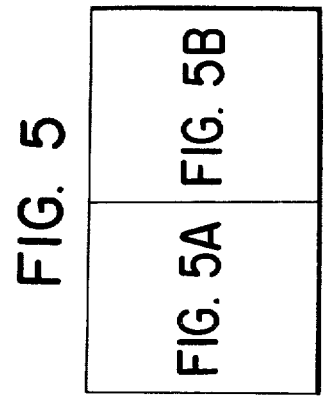
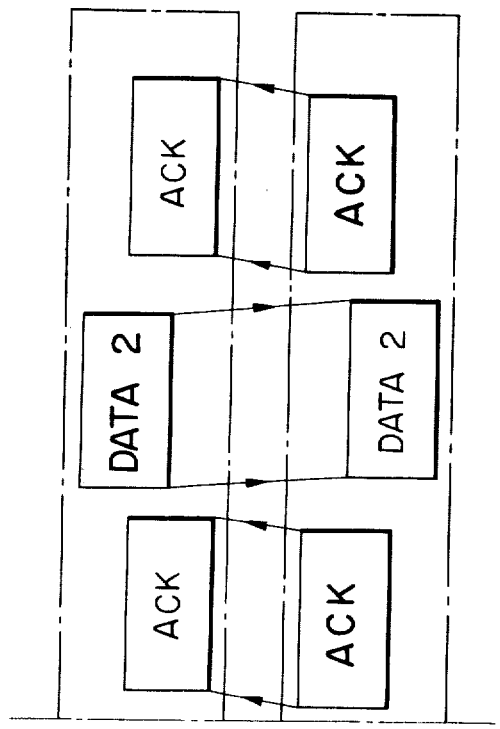
FIG. 5B

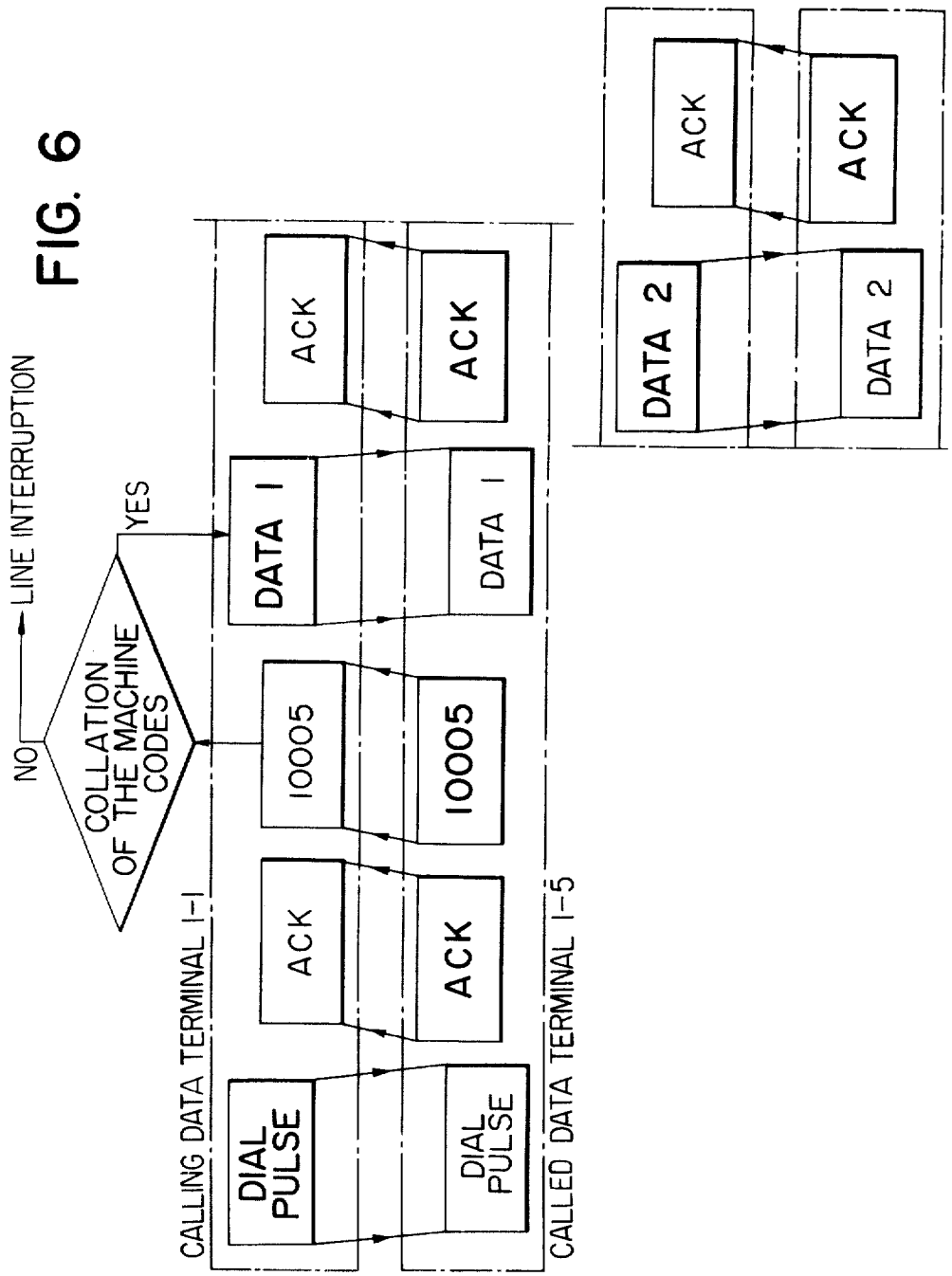

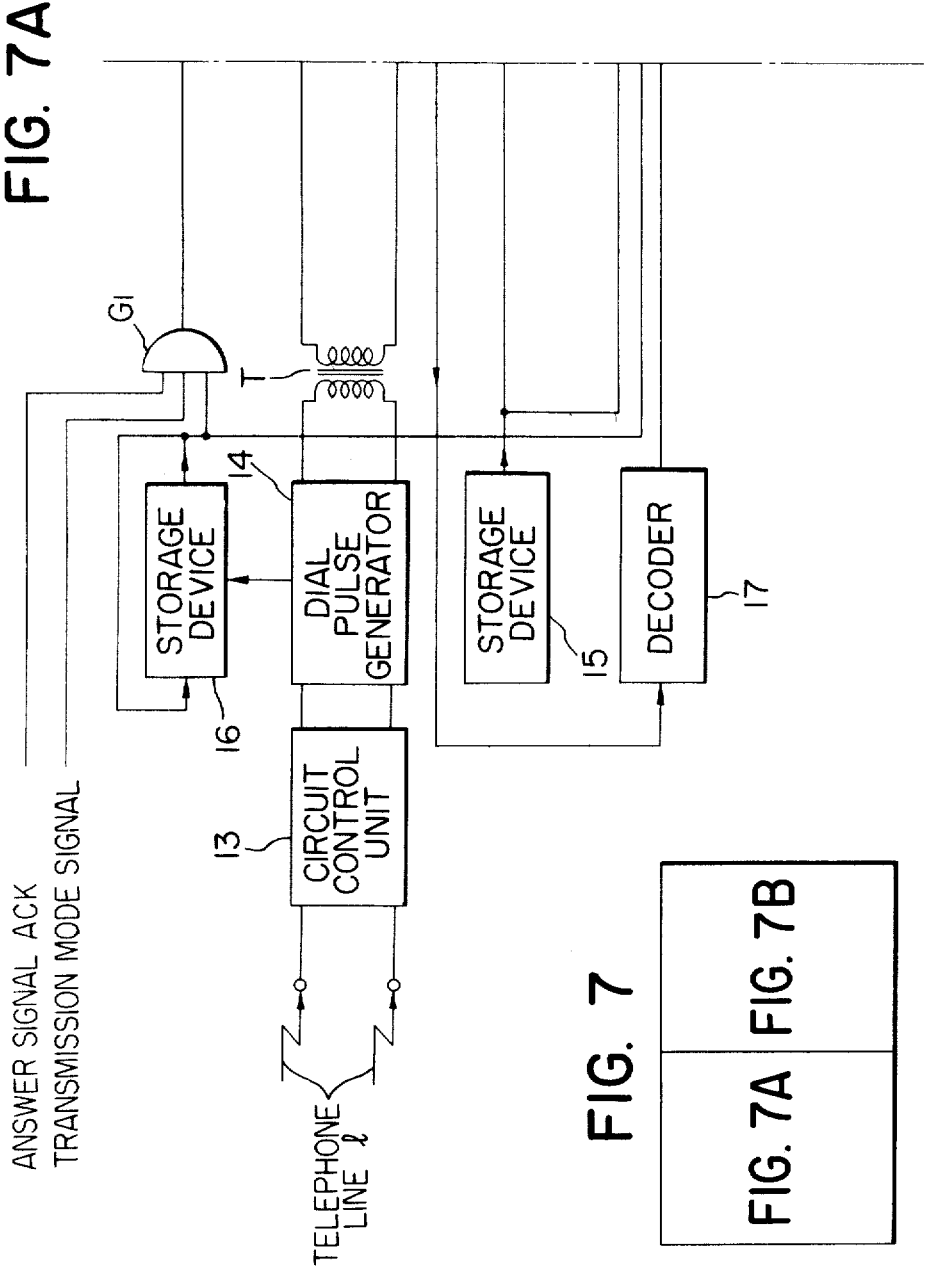

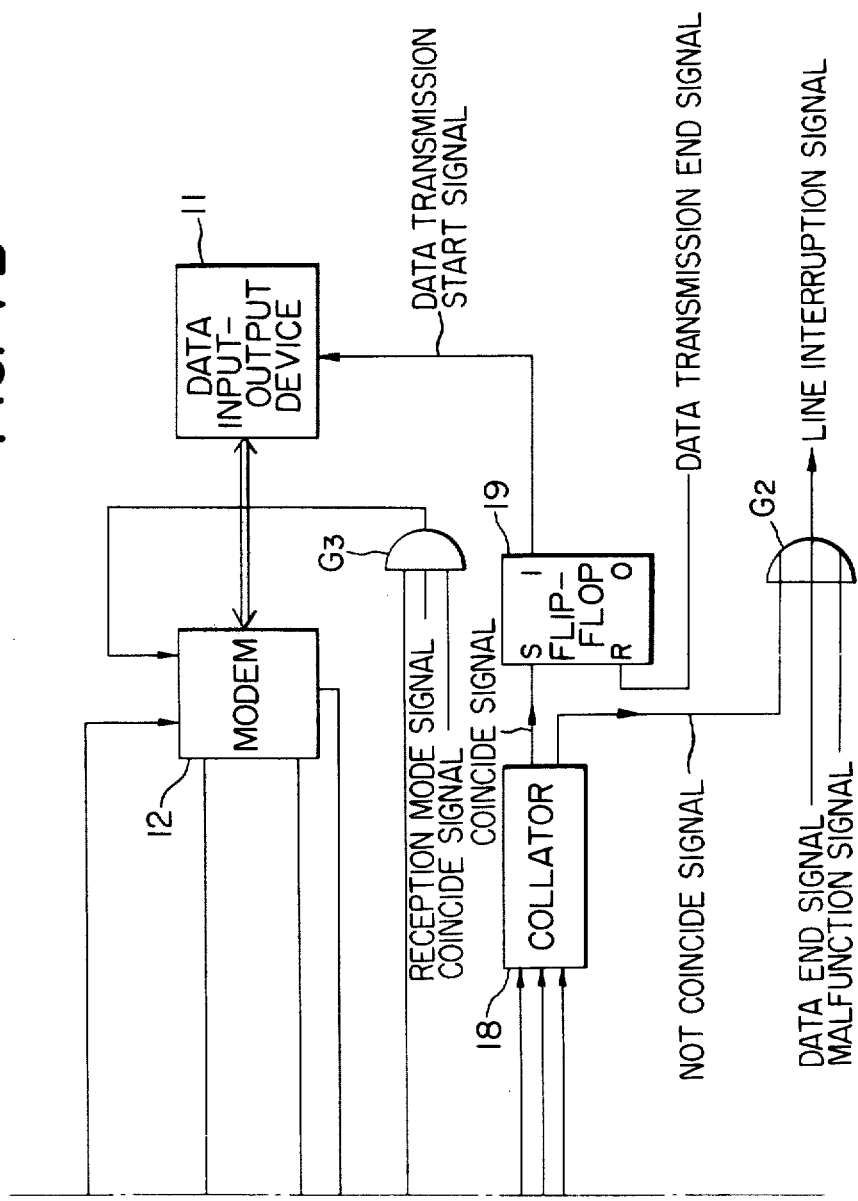

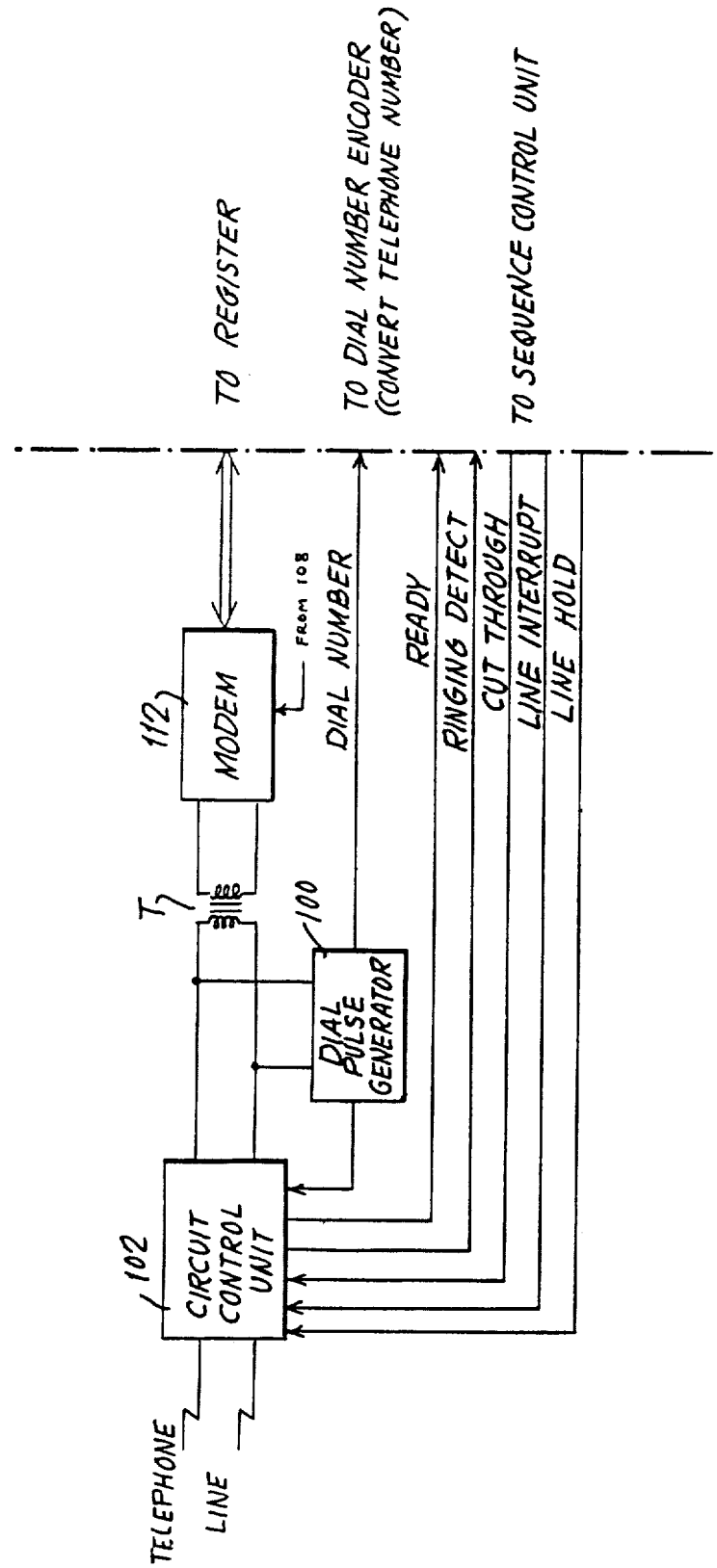

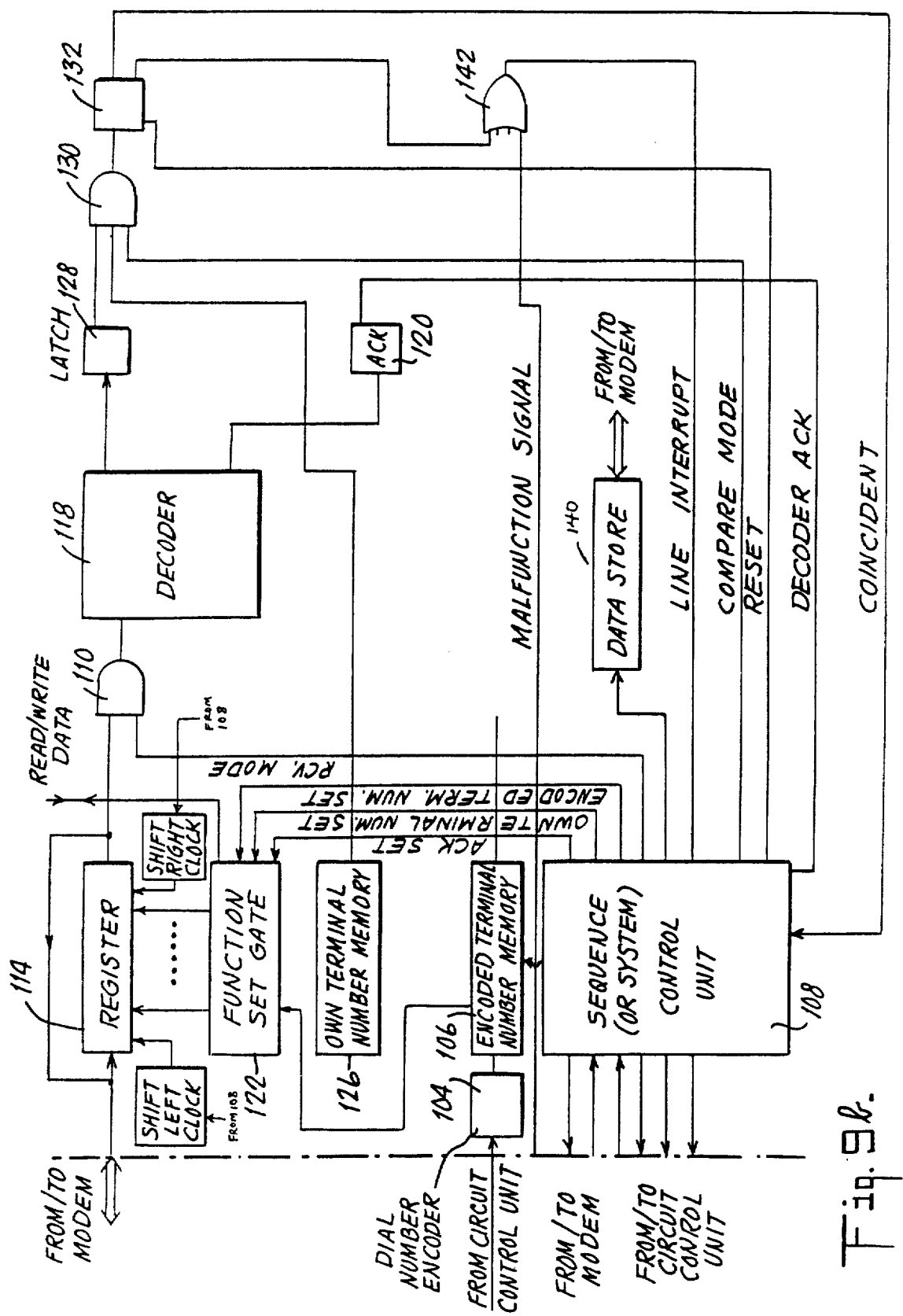

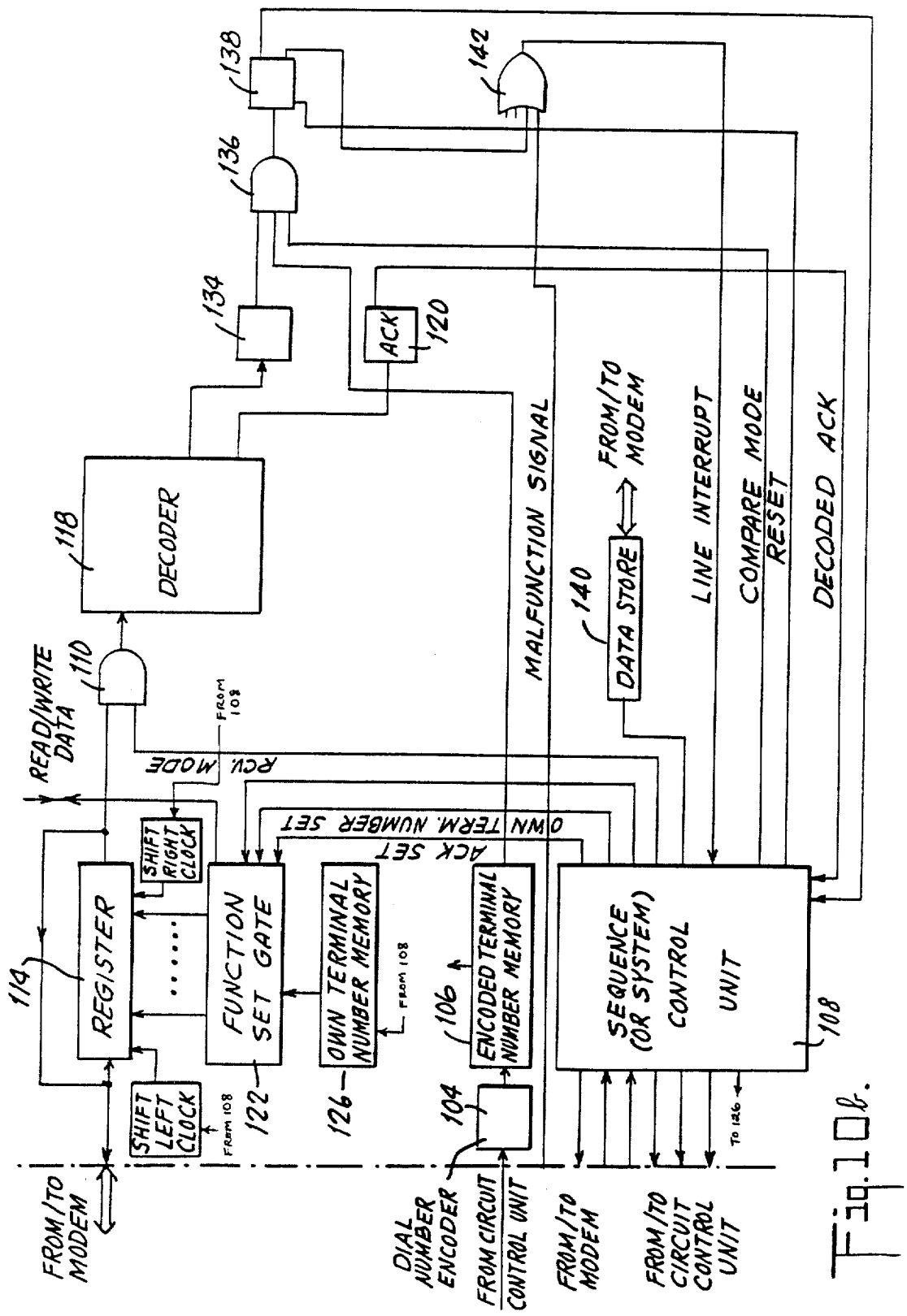

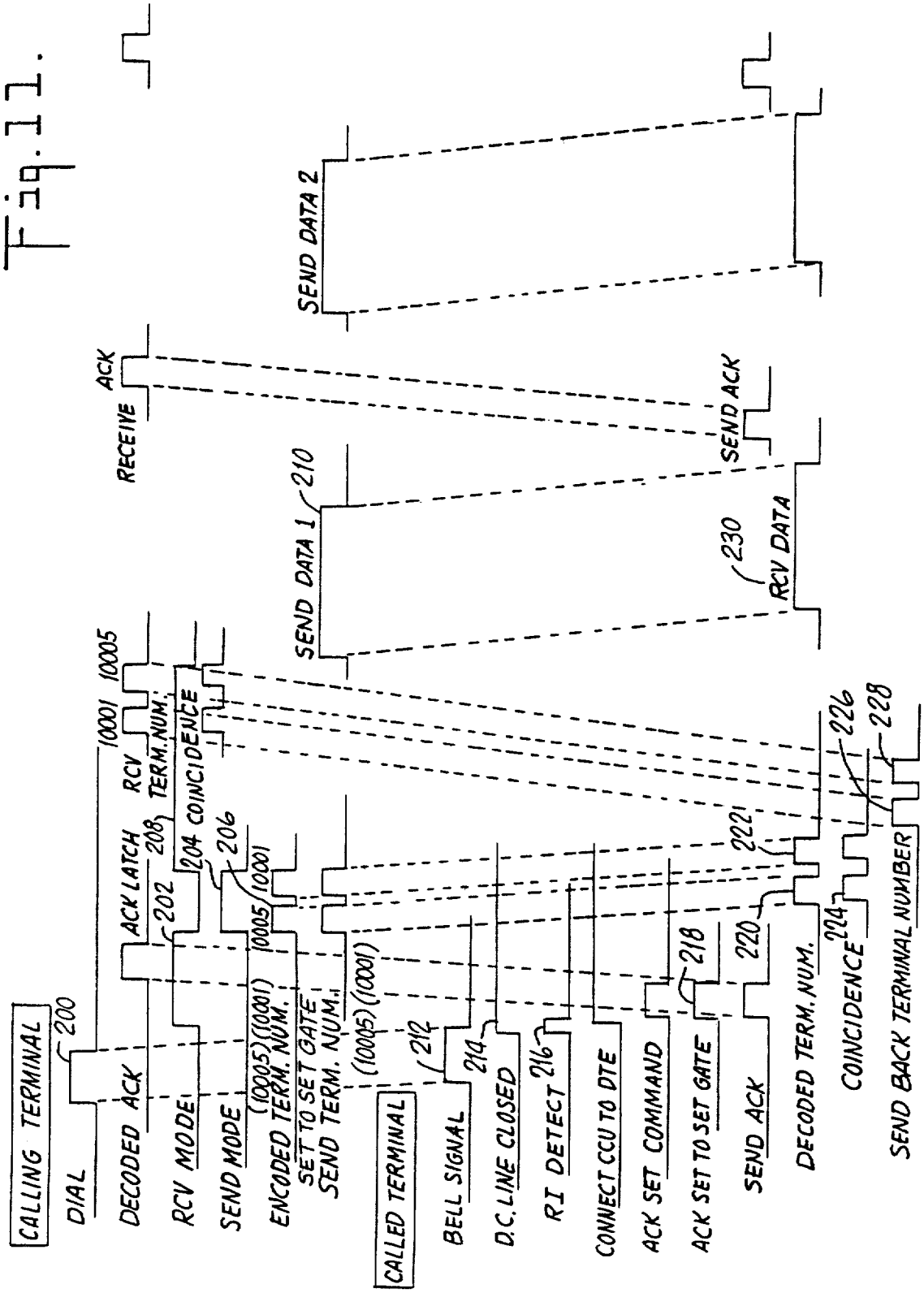

METHOD AND DEVICE FOR CONFIRMING CORRECT CONNECTION BETWEEN DATA TERMINALS IN DATA COMMUNICATION SYSTEM USING TELEPHONE NETWORK

REFERENCE TO RELATED APPLICATIONS

This application is a continuation-in-part of patent application Ser. No. 521,135, filed on Nov. 5, 1974 now abandoned. Said patent application is hereby incorporated by reference into this disclosure.

BACKGROUND AND SUMMARY OF THE INVENTION

The invention relates to data communication systems using the commercial telephone network to establish connections between terminals and to transmit and receive data over such connections. One familiar example of such data communication systems is a facsimile exchange system using the commercial telephone network where a user at one terminal dials the telephone number of another terminal and connects with it through the automatic telephone exchange. In such a system it is desirable to confirm that the connection is with the correct terminal prior to transmitting data. In one known facsimile system the calling terminal transmits a carrier signal at a predetermined frequency to the called terminal, and the called terminal in response transmits an acknowledgement signal back to the calling terminal. This avoids transmitting to a location which does not have a facsimile set that is a part of the system, but does not help if a telephone connection has been established to the wrong facsimile set of the same system. There are no means in the known commercial facsimile system for preventing misconnection of this and certain other types, and one object of the invention is to provide a technique and means to help prevent such misconnections.

To this end, in one embodiment of the invention the calling terminal establishes a telephone connection with the called terminal, and in response the called terminal transmits an acknowledgement signal back to the calling terminal. In response to this acknowledgement signal, the calling terminal transmits to the called terminal two separate identification codes: the identification code of the calling terminal and the identification code of the called terminal. Upon receipt of these two separate identification codes, the called terminal stores the code of the calling terminal for future use and compares the code of the called terminal received from the calling terminal with its own code, i.e., with the code of the called terminal which is always stored at the called terminal. An unfavorable comparison means that the called terminal is not the one that was meant to be called by the calling terminal or that there is some malfunction in either terminal or in the telephone line. Hence, if the comparison is unfavorable, the system ends the telephone connection between these terminals. If the comparison at the called terminal is favorable the called terminal transmits, back to the calling terminal, both the identification code of the called terminal and the identification code of the calling terminal previously received by the called terminal and stored for future use in the called terminal. Upon receipt of the two codes transmitted from the called terminal, the calling terminal compares each with the corresponding identification code previously transmitted by it to the called terminal. In case of an unfavorable comparison with respect to either of the codes (lack of correspondance between the two compared codes of the calling terminal or the two compared codes of the called terminal), the system ends the telephone connection because this indicates that the connection is between the wrong terminals, or that there is a malfunction in at least one of the terminals, or in the telephone line. In case of a favorable comparison, the calling data terminal starts transmitting data to the called data terminal. The data may be broken into blocks, and the called terminal may transmit back to the calling terminal an acknowledgement signal after the end of each block to indicate that the block has been received and that the called terminal is still in order. The calling terminal then sends another block of data to the called terminal, etc., until there are no more data blocks, in which case the system ends the telephone connection between these terminals.

In a somewhat different embodiment of the invention, after the telephone connection has been established between the calling terminal and the called terminal, the called terminal transmits an acknowledgement signal back to the calling terminal. In response to this acknowledgement signal the calling terminal transmits to the called terminal the identification code of the called terminal. In response to this, the called terminal compares the identification code received from the calling terminal with its own identification code, which is always stored in it. In case of an unfavorable comparison, the system ends the telephone connection between these terminals. In case of a favorable comparison, the called terminal again sends an acknowledgement signal to the calling terminal. If the calling terminal does not receive this second acknowledgement signal, for whatever reason, the calling terminal ends the telephone connection. If the calling terminal receives this acknowledgement signal, then it starts transmitting data to the called terminal. The data may again be in blocks, with an acknowledgement signal transmitted from the called terminal to the calling terminal after each block of data has been received by the called terminal.

In a still different embodiment of the invention, the calling terminal establishes the telephone connection with the called terminal, and in response to this the called terminal transmits an acknowledgement signal back to the calling terminal and then unconditionally transmits back to the calling terminal the identification code of the called terminal, which is always stored in that called terminal. The calling terminal compares the identification code received from the called terminal with the identification code of that same called terminal which has been previously stored in the calling terminal. If the comparison is unfavorable, the system ends this telephone connection. If the comparison is favorable, the calling terminal starts transmitting a block of data. At the end of the first, and any subsequent, block of data the called terminal sends back to the calling terminal an acknowledgement signal.

The terminals described here can operate either in a calling or in a called mode, and the confirmation procedure is fully automatic. The only operation which may be manual is the initial establishing of a telephone connection by the calling terminal.

BRIEF DISCRIPTION OF THE DRAWINGS

FIGS. 3a, 3b, 4a, 4b, 5a, 5b and 6 are flow charts used in explaining four different connecting procedures used in accordance with this invention.

FIGS. 7a, 7b, 8a, 8b, 9a, 9b, 10a and 10b are block diagrams of embodiments of the invention corresponding to the four techniques referred to above.

FIG. 11 is a timing diagram relating to the technique illustrated in FIGS. 4a and 4b and the block diagram of FIGS. 8a and 8b.

DETAILED DESCRIPTION

Figure 1:
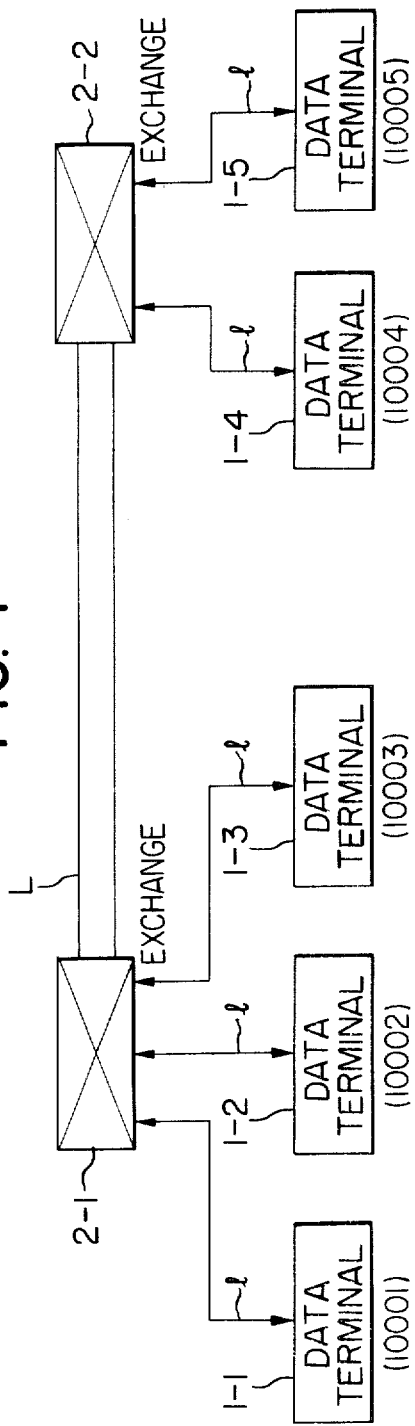
FIG. 1 is a schematic block diagram used in explaining a data communication system using commercial telephone network.
Figure 2:
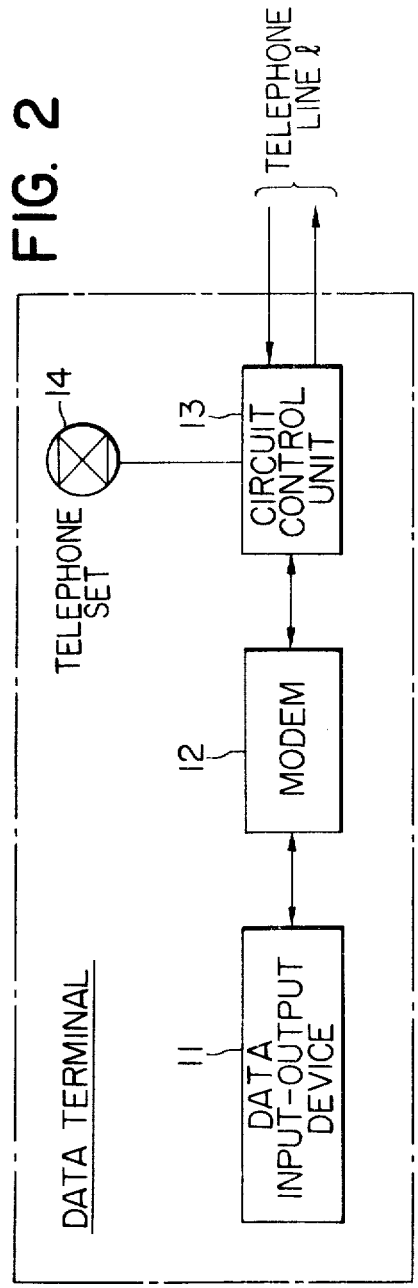
FIG. 2 is a block diagram of a terminal equipment which is a part of each data terminal.
Figure 3B:
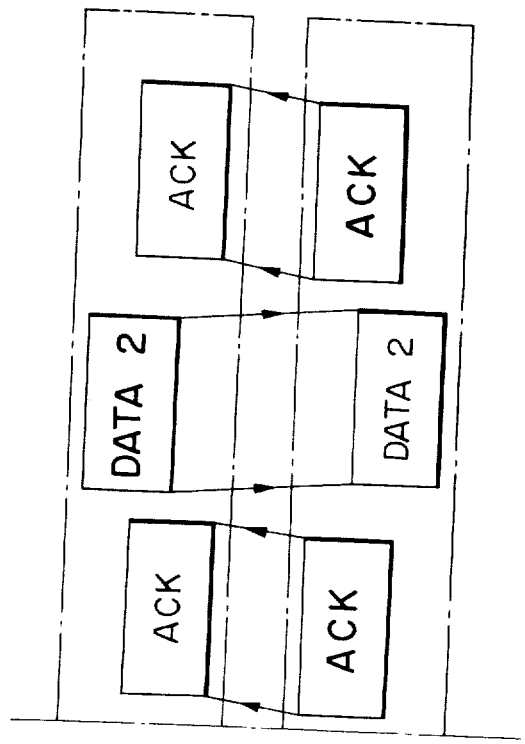
Figure 3:
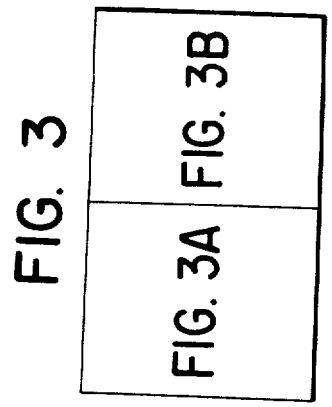
Figure 3A:
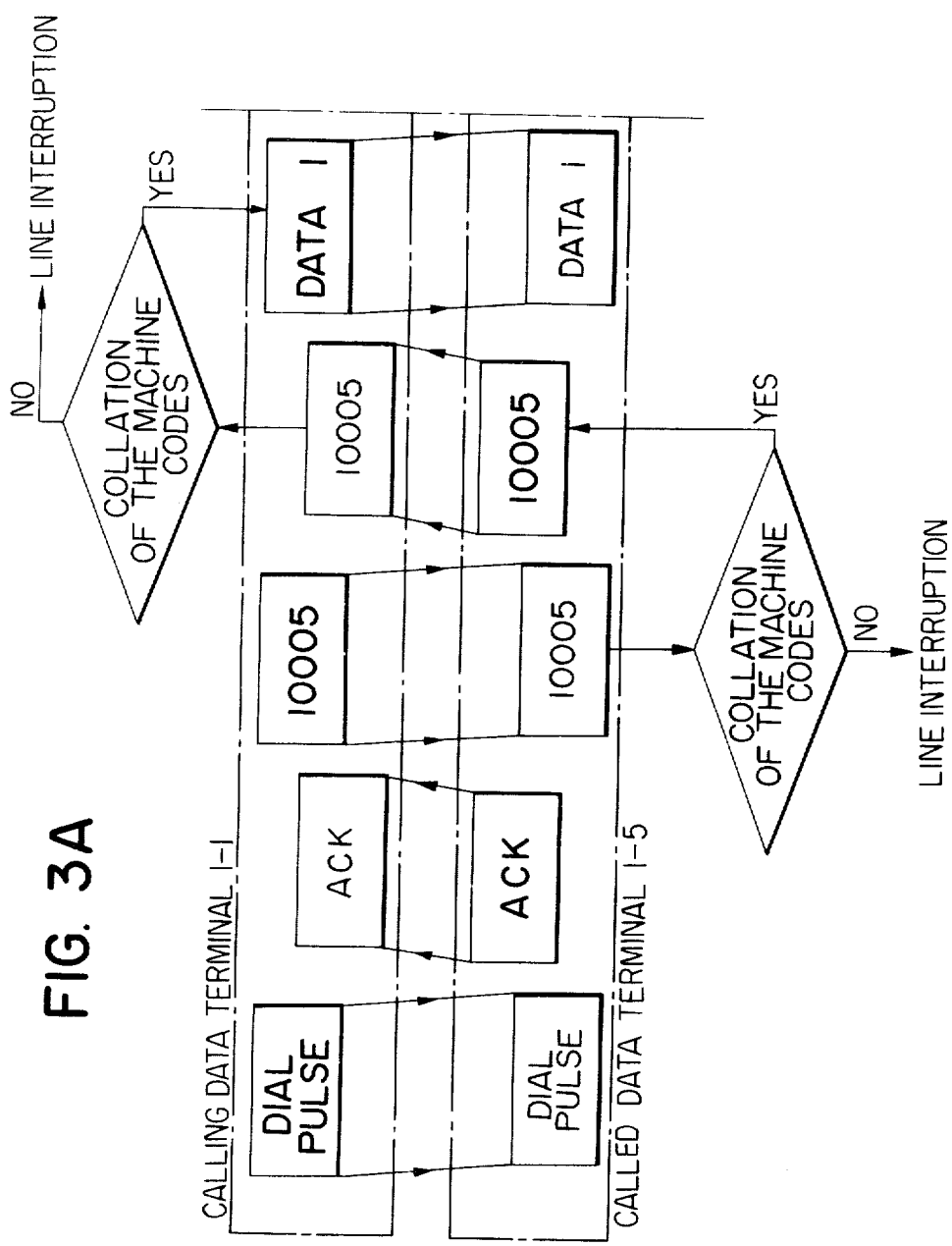

FIGS. 1, 2, 3a, 3b, 7a and 7b have been described in detail in the parent patent application which has been incorporated by reference here, and this description is not repeated here Briefly, FIG. 1 illustrates a number of data terminals 1—1, 1—2 and 1—3 which can communicate through a telephone exchange 2—1, a telephone line L and a telephone exchange 2—2 with other data terminals two of which are illustrated at 1—4 and and 1—5. FIG. 2 illustrates in somewhat greater detail the major portions of a data terminal. FIGS. 3a and 3b illustrate the sequence of events involved in one embodiment where a calling data terminal communicates with a called data terminal as follows: a dial pulse is transmitted from the calling to the called terminal; an acknowledgement signal is transmitted from the called to the calling terminal; the identification code of the called terminal is transmitted from the calling to the called terminal; the called terminal compares the received identification code with its own identification code stored in it; in case of an unfavorable comparison the called terminal ends the telephone connection but in case of a favorable comparison the called terminal retransmits its own code to the calling terminal; the calling terminal compares the received code of the called terminal with the code of the called terminal previously stored at the calling terminal; in case of an unfavorable comparison the calling terminal ends the telephone connection but in case of a favorable comparison the calling terminal transmits a block of data to the called terminal; after a block of data has been received by the called terminal the called terminal sends back to the calling terminal an achnowledgement signal, and the sequence of a transmission of a block of data from the calling to the called terminal and the transmission of an acknowledgement signal from the called to the calling terminal is repeated if necessary until all the blocks of data have been transmitted. FIGS. 7a and 7b illustrate in block diagram form, a generalized embodiment of a data terminal.

Referring to FIGS. 4a and 4b for an illustration of the flow of information in one embodiment of the invention, a calling data terminal 1—1 dials a called data terminal 1-5, as by a conventional dial telephone connected to the commercial telephone network. In response to being connected to the calling data terminal over the commercial telephone network, i.e., in response to establishing a DC telephone connection, the called data terminal 1-5 sends back to the calling data terminal 1—1, over the established telephone connection, an acknowledgement signal. In response to receiving this acknowledgement signal, the calling data terminal 1—1 sends to the called data terminal 1-5 two separate identification codes: (a) the identification code 10005, which is the machine code or identification code uniquely associated with the data terminal 1-5; and (b) the coe 10001, which is the machine or identification code of the calling data terminal 1—1 and is uniquely associated with it. Every terminal has its own machine or identification code, and this code is typically different from the telephone number at which the terminal can be reached over the commercial telephone network. When a terminal is used as a calling terminal, the identification code of the called terminal is entered in a suitable memory in the calling terminal, e.e., at the tim of dialing the telephone number of the called data terminal.

In response to receiving the two identification codes from the calling terminal, the called terminal compares the received code of the called terminal (the code 10005) with its own identification code (10005) which is always stored in it. If the comparison or collation is unfavorable, e.g., the two codes are not identical, the telephone connection between the calling and called data terminals is terminated by the called data terminal. Such unfavorable comparison may result, for example, if the calling data terminal has dialed the phone number of a terminal other than the terminal 1-5 while it was meant to connect with the terminal 1-5, or it may result from noise in the telephone line which has changed the identification code transmitted over it to a different one, or from a malfunction at either or both of the calling and called data terminals or in the telephone line or exchange connecting them.

If the comparison or collation at the called data terminal is favorable (e.g., the received identification code of the called terminal and the identification code of the called terminal which is always stored in it are identical), the called data terminal sends back to the calling terminal two identification codes: (a) the identification code of the calling terminal (100001) which was received by the called from the calling terminal previously; and (b) the identification code of the called terminal which is always stored in it (10005). In response to receipt of these two identification codes from the called terminal, the calling terminal compares: (a) the code of the calling terminal received from the called terminal with the code of the calling terminal which is always stored in the calling terminal; and (b) the code of the called terminal received from the called terminal with the code of the called terminal which was stored in the calling terminal for the purpose of communicating with the particular selected called terminal. If either of the comparisons is unfavorable, or if both are unfavorable, the calling terminal terminates the telephone connection. If both comparisons are favorable, the calling terminal starts transmitting a block of data to the called terminal. After the block of data has been received by the called terminal, the called terminal sends back to the calling terminal an acknowledgement signal. If there are subsequent blocks of data, the calling terminal starts sending a second block of data to the called terminal. When this second block of data has been received by the called terminal, the called terminal again sends an acknowledgement signal back to the calling terminal, etc., until there are no more blocks of data to be transmitted from the calling to the called terminal, at which time the calling terminal terminates the telephone connection.

Figure 8K:
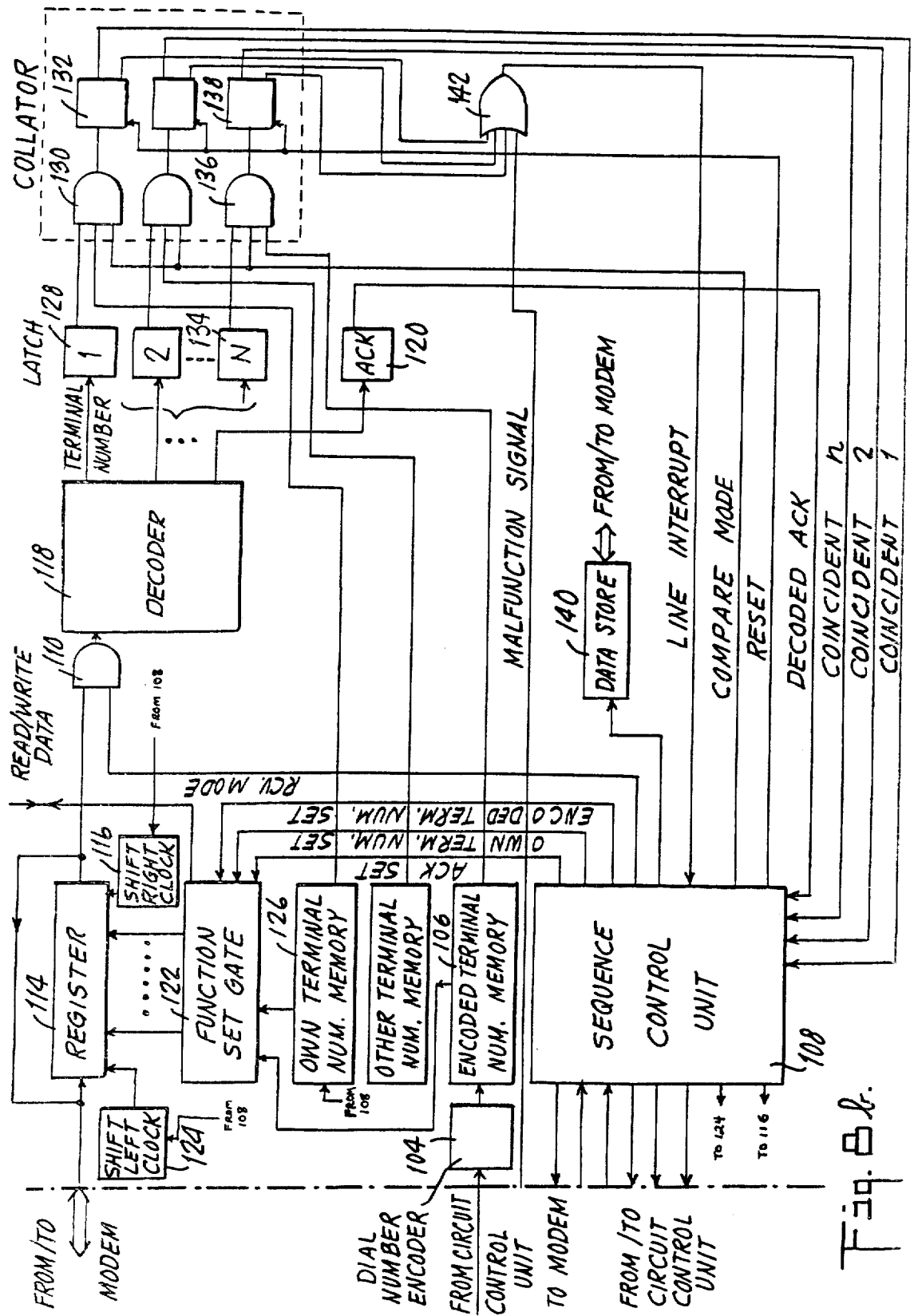

Referring to FIGS. 8a and 8b, and to the timing chart in FIG. 11, assume that the terminal shown in FIGS. 8a and 8b is operating as the calling terminal 1—1 discussed in connection with FIGS. 4a and 4b. Its operation as the called data terminal 1-5 will be described after its description below in the calling mode operation.

In the calling mode operation, a dial pulse generator 100, which may be a manually operated dial telephone, generates the dialing pulses necessary to reach the called terminal 1-5 through the telephone exchange network. These dial pulses go on to the telephone line through a circuit control unit 102, and concurrently go to a dial number encoder 104 where they are encoded into the identification code 10005 of the called data terminal 1-5, and this identification code is stored in an encoded terminal number memory 106. This occurs during the dial interval indicated at 200 in FIG. 11. After the dial interval 200 is over, a sequence control unit 108 applies a control signal designated RCV mode to a gate 110 during a time interval designated 202 in FIG. 11. During this time interval 202 the called terminal 1-5 sends back over the telephone line an acknowledgement signal ACK which is received over the telephone line and proceeds through the circuit control unit 102, a transformer T, a modem 112, a register 114 (through which it is clocked by a shift-right clock 116 enabled during this interval 202 by a suitable control signal from unit 108), thence through gate 110, which is at this time enabled by the RCV mode signal, thence to a decoder 118 which recognizes the received signal as the acknowledgement signal ACK, and in response sets a latch 120 labelled ACK. This latch 120, when set, sends a corresponding signal to sequence control unit 108 over the line labelled decoded ACK, and in response to this the sequence control unit 108 disables the gate 110 by ending the control signal RCV mode.

Also in response to the setting of the latch 120, the sequence control unit 108 sends a control signal to a function set gate 122 over a line labelled encoded terminal number set, causing the function set gate to receive the identification code 10005 from the encoded terminal number memory 106 and to transfer this number to the register 114, which is at this time shifting to the left under the control of a shift-left clock 124 enabled at this time by a suitable control signal from the sequence control unit 108. This shift-left clock 124 remains active during the interval 204 in FIG. 11. The identification code 10005 is thus transmitted to the called terminal during the time interval 206. The sequence control unit 108 then sends another control signal, over the line labelled own terminal number set, which causes the function set gate 122 to receive the contents of an own terminal number memory 126, which at all times stores the identification code 10001 of the calling terminal, and to transfer this identification code to the register 114, from where it is sent to the modem 112 under the control of the shift left clock 124. By this time and by means of the above operations, the calling terminal has received an acknowledgement signal from the called terminal and has sent to it the identification code 10005 of the called terminal and the identification code 10001 of the calling terminal.

In response to the sending of the identification code 10001, the sequence control unit 108 disables the shift-left clock 124, enables the shift-right clock 116 and again enables the gate 110 by the control signal over the line RCV mode. This takes place during the time interval 208 in FIG. 11. When during this time interval the identification code 10001 is received over the telephone line from the called terminal, this identification code proceeds through the circuit control unit 102, the transformer T, the modem 112, the register 114 (being clocked to the right by clock 116) and gate 110, to the decoder 118. In response to this identification code the decoder 118 sets this identification code in a latch 128. The contents of this latch 128 go to a gate 130, which also receives a control signal from the sequence control unit 108 over the line labelled compare mode, this control signal enabling the gate 130, and also the contents of the own terminal number memory 126. If the number in the latch 128 and the number from the own terminal number memory 126 are identical, as they should be, the gate 130 is enabled and sets a latch 132. The set output of this latch 132 goes to the sequence control unit 108 over a line labelled coincident 1 to indicate that the comparison was favorable.

Following this, the calling terminal receives over the same route the identification code 10005 sent from the called terminal and the decoder 118 sets this number in a corresponding latch, in this case a latch 134. The contents of this latch are similarly compared, in a gate 136, with the contents of the encoded terminal number memory 106. If the two compared codes are identical, the gate 136 sets a latch 138, whose output goes to the sequence control unit 108 over a line labelled coincident N. By this time and through these operations, the identification code of the calling data terminal, which is always stored in the calling data terminal (in memory 126), has been compared with the identification code of the calling data terminal which was previously sent to the called data terminal and was received back from the called data terminal. In addition, the identification code of the called data terminal, which was received from the called data terminal, has been compared with the identification code of the called data terminal which was stored in the calling data terminal (in memory 106). As a result of the determination that both comparisons were favorable, the sequence control unit initiates the sending of a block of data from a data store 140 by issuing a suitable control signal during a time interval 210 to cause the data store 140 to transmit data through the modem 112 and the telephone line. When the time interval 210 ends and the block of data has been transmitted, the calling data terminal receives from the called one an acknowledgement signal whereby the latch 120 of the calling terminal is similarly set. In response to the setting of this latch 120, the sequence control unit 108 again commands the data store 140 to transmit another block of data, etc., until all blocks of data from the data store 140 that were meant to be transmitted have been so transmitted.

The terminal shown in FIGS. 8a and 8b can alternately work as the called terminal 1-5. In the called mode the terminal receives a bell signal over the telephone line during a time interval 212, in response to which the DC line connection between the calling and called data terminals is closed at the start of the time interval 214, and the circuit control unit 102 sends at time interval 216 a suitable control signal to the sequence control unit 108 over a line labelled ringing detect. In response to this control signal, the response control unit 108 sends a control signal to the function set gate 122 over a control line labelled ACK set, which causes the function set gate to generate an acknowledgement signal and transfer the same to the register 114. This ACK set control signal is active during the time interval 218, and during this time interval the shift-left clock 124 is suitably enabled by the sequence control unit 108 to shift the contents of the register 114 to the MODEM 112 for transmission to the calling terminal. When the calling terminal 10001 sends out the identification codes 10005 and 10001 as described above, the identification code 10005 is received in a similar manner through the register 114 and gate 110 and is similarly decoded at decoder 118, but is transferred in this case to latch 128. The contents of the latch 128 are similarly compared with the contents of the own terminal number memory 126, now containing the identification code 10005 of the called terminal, the gate 130 being enabled by a control signal from the sequence control unit 108 sent over the line labelled "compare mode" during the time interval labelled "224" in FIG. 11. The identification code 10001 of the calling data terminal is shifted into the register 114 during time interval 211 under suitable control of the shift-right clock 116, and remains in the register 114. At time interval 226 the shift-left clock 124 is enabled by the sequence control unit 108 to shift back to the modem 112 and to the calling terminal the identification code 10001, and during the time interval 228 the function set gate 122 is enabled by a control signal from the sequence control unit 108 sent over the line labelled own terminal number set to load the identification code 10005 into the register 114, from which it is transferred to the modem under the control of the shift-left clock 124, for transmission back to the calling terminal.

When the calling terminal starts sending data blocks as discussed above, the first data block is received at the called data terminal during time interval 230, and is loaded into the data store 140 during that time interval under the control of the sequence control unit 108. At the termination of the first data block, the function set gate 122 is enabled by a control signal from the sequence control unit 108 over the line ACK set to send an acknowledgement signal ACK back to the calling terminal and, as described above, the transmission of data blocks to the called terminal may continue in the same manner.

If, when the data terminal shown in FIGS. 8a and 8b is operating in the calling mode, either one of latches 132 and 138 is not set during time interval 208, at the end of that time interval the reset outputs of these latches are applied through an OR-gate 142 and a line labelled line interrupt to the sequence control unit 108. If the sequence control unit 108 receives a control signal over the line labelled line interrupt after the time interval 208, it sends a control signal to the circuit control unit 102 over the line labelled line interrupt to end the telephone connection to the called terminal. Alternatively, the sequence control unit 108 may be set to end the telephone connection only if the latch 138 remains in its reset state after the time interval 208. The OR-gate 142 may receive another input, over a line labelled malfunction signal, which may indicate a malfunction at the terminal calling for a termination of the telephone connection with the called terminal.

Similarly, if when the data terminal shown in FIGS. 8a and 8b is operating in the called mode, the latch 132 remains reset after the time interval 224, the reset state of that latch is transmitted to the sequence control unit 108 through the OR-gate 142, and in response the sequence control unit 108 terminates the telephone connection to the calling terminal by means of a suitable control signal sent to the circuit control unit 102 over the line labelled line interrupt.

Figure 5A:
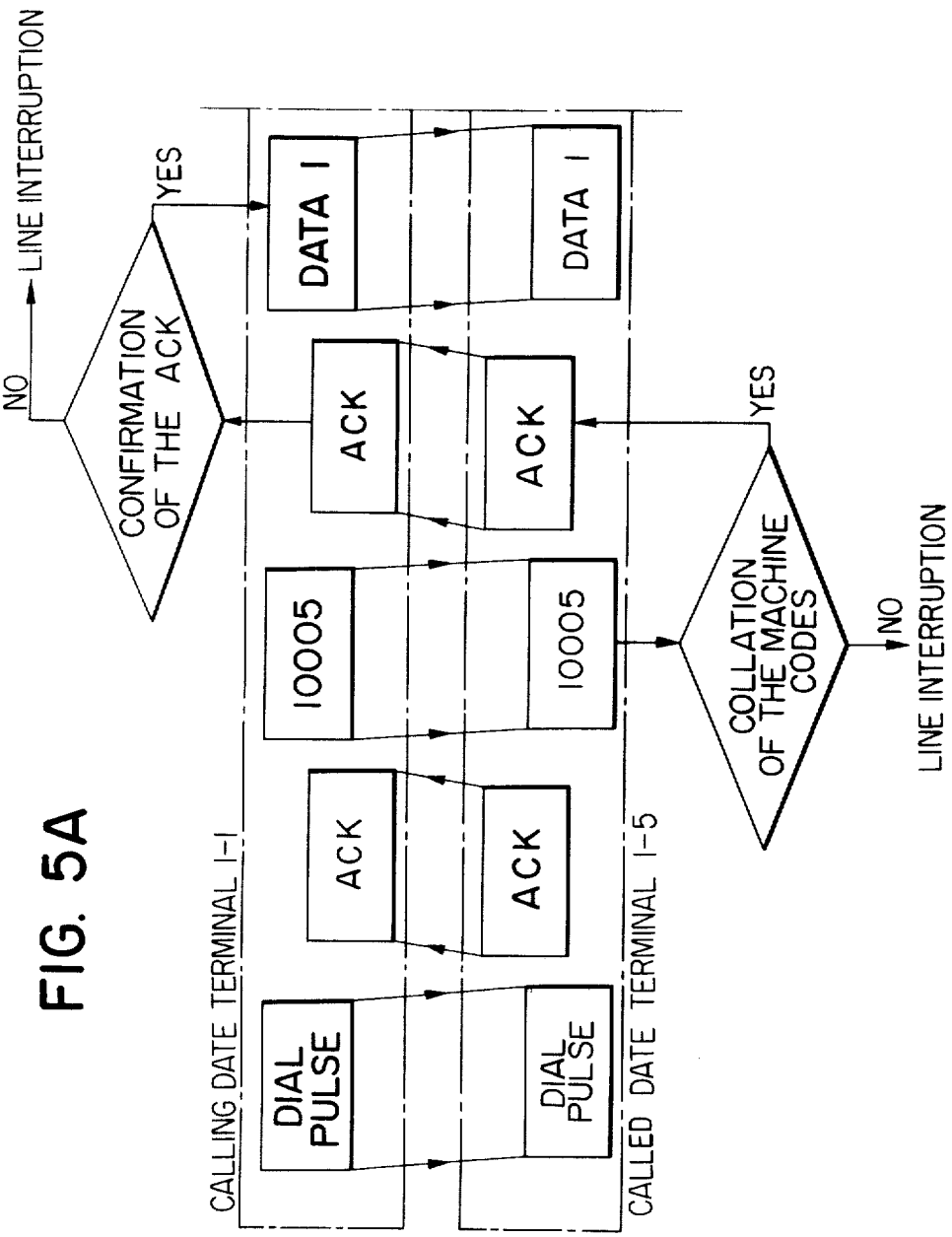

In the different embodiment of the invention illustrated in FIGS. 5a and 5b, the calling terminal 1—1 receives an acknowledgement signal as in the embodiment of FIGS. 4a and 4b, but unlike that embodiment transmits back to the called terminal 1-5 only the identification number (10005) of the called data terminal 1-5, rather than the identification numbers of both the called and the calling data terminals (10005 and 10001) as in the embodiment of FIGS. 4a and 4b. In response to a favorable comparison at the called data terminal 1-5 between the number of the called terminal received from the calling terminal and the number of the called terminal which is always stored in the called terminal, the called terminal transmits an acknowledgement signal back to the calling terminal. In response to an unfavorable comparison the called terminal interrupts the telephone connection to the calling terminal. In response to receiving an acknowledgement signal from the called terminal, the calling terminal 1—1 checks for confirmation of a received acknowledgement signal. In case of no confirmation, the calling terminal 1—1 terminates the telephone connection to the called terminal 1-5. In response to a confirmation, the calling terminal 1—1 transmits a block of data to the called terminal 1-5. After receipt of this block of data, the called terminal 1-5 transmits an acknowledgement signal back to the calling terminal 1—1, the calling terminal transmits another block of data for the called terminal, etc., until there are no more blocks of data to transmit.

Figure 9A:
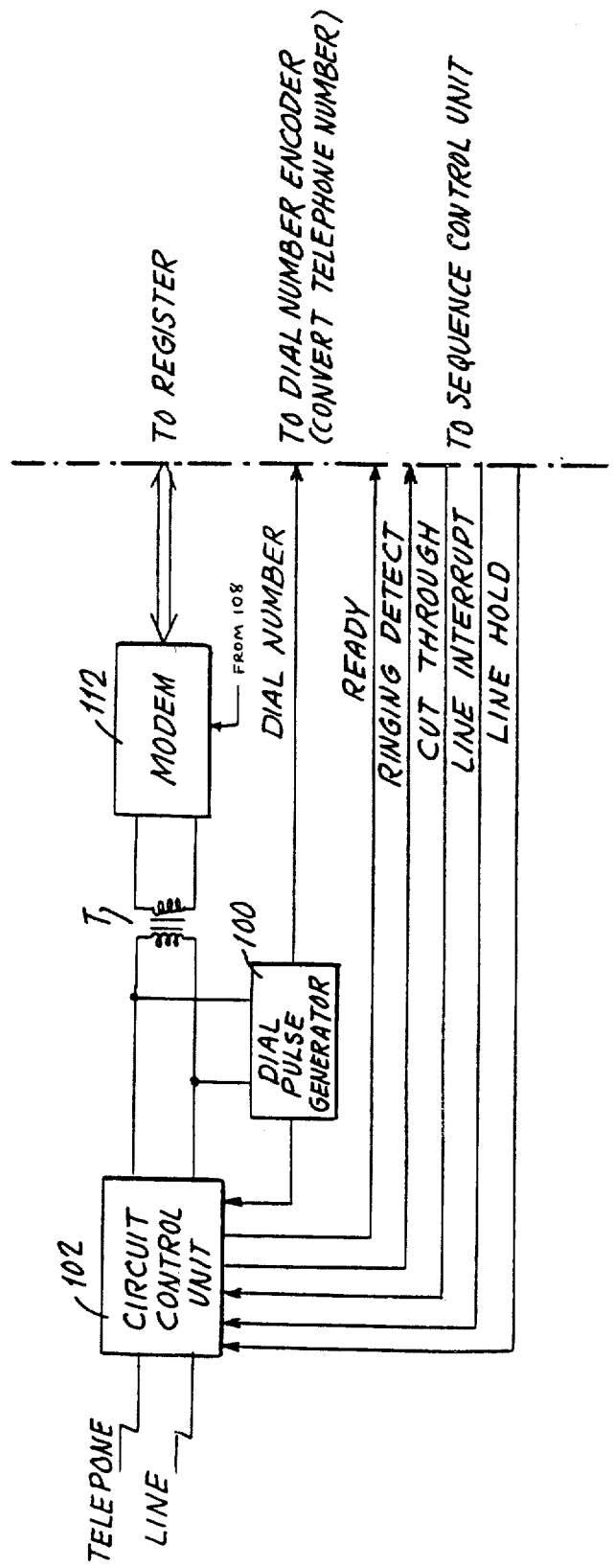

Referring to FIGS. 9a and 9b, the circuit implementing the procedure of FIGS. 5a and 5b is a subset of the circuit discussed in connection with 9a and 9b. Assume first that the circuit in FIGS. 9a and 9b is operating as the calling terminal 1—1. It connects to, and receives an ACK signal from, the called terminal as described in connection with FIGS. 8a and 8b, and sets the latch 120. When set, this latch sends a control signal over the line labelled decoder ACK, and in response to this the sequence control unit 108 sets the function-set gate 122 with the identification code of the called terminal (10005) from the memory 106 and loads that code from the function-set gate 121 into the register 114 for transmission to the called terminal 1-5. The circuit subsequently receives an acknowledgement signal from called terminal 1-5, and in response again sets the acknowledgement latch 120, which has been reset after its previous setting by a suitable control signal (not shown) from the sequence control unit 108. If the latch 120 has been so set, the calling terminal 1—1 starts sending a block of data as described in connection with FIGS. 8a and 8b, and sends additional blocks of data and receives additional acknowledgement signals as described above as long as there are blocks of data to transmit and the telephone line is open.

Assume now that the circuit of FIGS. 9a and 9b is operating as the called terminal. It transmits an acknowledgement signal to the calling terminal as described above, and received the identification code of the called terminal (10005) as described above. This code is compared as described above at gate 130 with the number of the called terminal (10005) from the own terminal number memory 126. In the case of a favorable comparison, the latch 132 is set and the sequence control unit 108 causes the sending of an acknowledgement signal to the calling terminal 1—1 as described above. In the case of no coincidence, the latch 132 is reset and the sequence control unit 108 interrupts the telephone line as described above.

In a still different embodiment of the invention, illustrated in FIG. 6, the called terminal 1-5 sends an acknowledgement signal to the calling terminal 1—1 as described above but then, without waiting for any signals from the calling terminal, transmits to the calling terminal the identification code of the called terminal. This identification code of the called terminal received from that called terminal is compared at the calling terminal with the number of the called terminal which is stored at the calling terminal, and the telephone line between the two terminals is interrupted in the case of an unfavorable comparison. In the case of a favorable comparison, the calling terminal 1—1 sends a block of data to the called terminal, receives from it an acknowledgement signal, sends another block of data, etc., until there are no more blocks of data to send or the telephone line is interrupted or terminated.

Figure 10A:
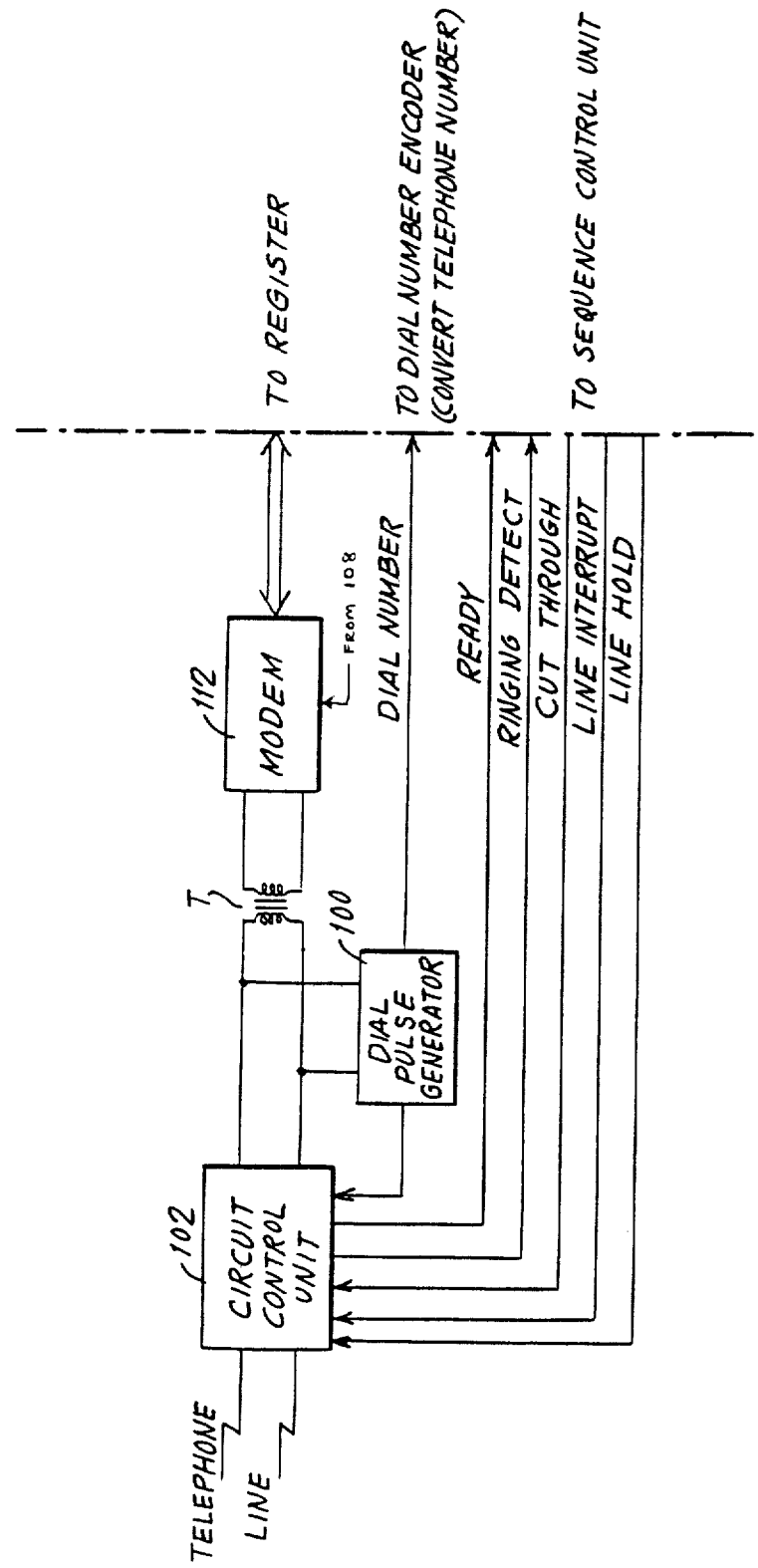

Referring to FIGS. 10a and 10b, the circuit for carrying out the procedure discussed in connection with FIG. 6 is again a subset of the circuit discussed in connection with FIGS. 8a and 8b. Assume that the circuit in FIGS. 10a and 10b operates as the calling terminal 1—1. It receives an acknowledgement signal as described above and then it receives the code (10005) of the called terminal, which is compared at the gate 136 with the code of the called terminal stored in the memory 106. In the case of a favorable comparison the latch 138 is set and a block of data is transmitted from the calling to the called terminal as described above. In the case of an unfavorable comparison, the control unit 108 interrupts the telephone conversation to the called terminal as described above.

Assume now that the circuit in 10a and 10b is operating as the called terminal. It sends an acknowledgement signal to the calling terminal as described above and then sends its own identification code (10005) from the memory 126 to the calling terminal 10001, again as described above. Thence it receives a block of data as described above, sends out an acknowledgement signal as described above, and this proceeds as described above until there are no more blocks of data to be transmitted.

In the case of lack of coincidence, the embodiments in FIGS. 9a, 9b and 10a, 10b operate as that of FIGS. 8a and 8b.

Each of the individual components of the circuits shown in FIGS. 7a through 10a is known construction; the novelty is not in the structure of any individual component of these circuits but in the interconnection and cooperation of these components and in synergistic results produced by this combination and cooperation of the individual components. For example, referring to FIGS. 8a and 8b the circuit control unit 102 can be a combination of conventional gating circuits, as commonly used in facsimile transmission systems, for carrying out the functions described in detail above. Similarly the dial pulse generator 100, the transformer T and the modem 12 can be of the type commonly used in facsimile transmission systems. The register 114 can be a conventional bidirectional counter having a sufficient number of stages to accommodate the acknowledgement signal and the identification codes transmitted through it. The clocks 116 and 124 can similarly be conventional circuits generating uniformly spaced shifting pulse at the requisite rate. The function set gate 122 can be the combination of a register storing an acknowledgement signal and a set of gates for passing on to the register 114 either the contents of the memory 106 or the contents of the memory 126, as determined by a control signal from the sequence control unit 108. The memories 126 and 106 can each be a register memory.

The dial number encoder 104 can be a read-only memory (ROM) doing the requisite encoding. The sequence control unit 108 can be a combination of conventional gating circuits and pulse generating circuits interconnected to generate the sequence of control signals consistent with the timing slots indicated in FIG. 11. The gates 110, 130 and 136 can be conventional AND-gates, while the gate 142 can be a conventional OR-gate. The decoder 118 can be an ROM of conventional design, and each of latches 128, 134, 132, 138 and 120 can be a register shifted by suitable timing pulses from a clock in the sequence control unit 108. The data store 140 can be any conventional storage unit, such as a magnetic tape or a magnetic disc unit. Referring to FIGS. 7a and 7b the collator 18 can be a combination of conventional AND-gates, one receiving the outputs of decoder 17 and storage device 15 and the other receiving the outputs of decoder 17 and storage device 16, each gate receiving a suitable control signal (not shown) to provide an enabling input to one or to the other of these AND-gates at the requisite time described in detail in the parent patent application.

I claim:

1. A method of operating a data transmission system having a plurality of data terminals interconnected through a telephone network, each data terminal having an own identification code stored therein, comprising the steps of:
   establishing a telephone connection from a calling data terminal to a called data terminal over said telephone network, and sending an acknowledgement signal from the called to the calling data terminal in response to the establishment of said connection,
   transmitting from the calling to the called data terminal, in response to receipt of said acknowledgement signal by the calling data terminal, a code identifying the called data terminal;
   comparing at the called data terminal the code transmitted thereto from the calling data terminal with the own code of the called data terminal stored in the called data terminal, and transmitting from the called to the calling data terminal, only in the case of a favorable comparison, the own code of the called data terminal stored in the called data terminal; and
   comparing at the calling data terminal the code of the called terminal transmitted thereto from the called data terminal with the code of the called terminal previously transmitted from the calling to the called data terminal, and initiating transmission of data between the calling and the called data terminal only in the case of a favorable comparison of said codes at the calling data terminal.

2. A method of operating a data transmission system having a plurality of data terminals interconnected through a telephone network, each data terminal having an own identification code stored therein comprising the steps of:
   establishing a telephone connection from a calling data terminal to a called data terminal over said telephone network, and sending an acknowledgement signal from the called to the calling data terminal in response to the establishment of said connection;
   transmitting from the calling to the called data terminal, in response to receipt of said acknowledgement signal by the calling data terminal, a code identifying the called data terminal and the own code of the calling data terminal;

comparing at the called data terminal the code identifying the called data terminal and transmitted thereto from the calling data terminal with the own code of the called terminal stored in the called data terminal, and transmitting from the called to the calling data terminal, only in the case of a favorable comparison, the own code of the called terminal stored in the called data terminal and the code identifying the calling data terminal and previously transmitted therefrom to the called data terminal; and comparing at the calling data terminal the identifying codes transmitted thereto from the called data terminal with the codes previously transmitted from the calling to the called data terminal, and initiating transmission of data between the calling and the called data terminal only in the case of a favorable comparison of said codes at the calling data terminal.

3. A method of operating a data transmission system having a plurality of data terminals interconnected through a telephone network, each data terminal having an own identification code stored therein, comprising the steps of:

establishing a telephone connection from a calling data terminal to a called data terminal over said telephone network, and sending a first acknowledgement signal from the called to the calling data terminal in response to the establishment of said connection;

transmitting from the calling to the called data terminal, in response to receipt of said first acknowledgement signal by the calling data terminal, a code identifying the called data terminal;

comparing at the called data terminal the code transmitted thereto from the calling data terminal with the own code of the called terminal stored in the called data terminal, and transmitting from the called to the calling data terminal, only in the case of a favorable comparison, a second acknowledgement signal; and initiating transmission of data between the calling and the called data terminal only in the case of receipt of the second acknowledgement signal by the calling data terminal.

4. A method of operating a data transmission system having a plurality of data terminals interconnected through a telephone network, each data terminal having an own identification code stored therein, comprising the steps of:

establishing a telephone connection from a calling data terminal to a called data terminal over said telephone network, storing at the calling terminal the identification code of the called terminal, and sending an acknowledgement signal from the called to the calling data terminal in response to the establishment of said connection;

transmitting from the called to the calling data terminal, following the transmission of said acknowledgement signal, the own code of the called terminal stored at the called terminal;

comparing at the calling data terminal the identifying code transmitted thereto from the called data terminal with the identifying code of the called data terminal stored in the calling data terminal; and initiating transmission of data between the calling and the called data terminal only in the case of a favorable comparison of said codes at the calling data terminal.

* * * * *